M. SCHULER.
GYROSCOPIC COMPASS.
APPLICATION FILED JUNE 7, 1911.
1,186,686.
Patented June 13, 1916.
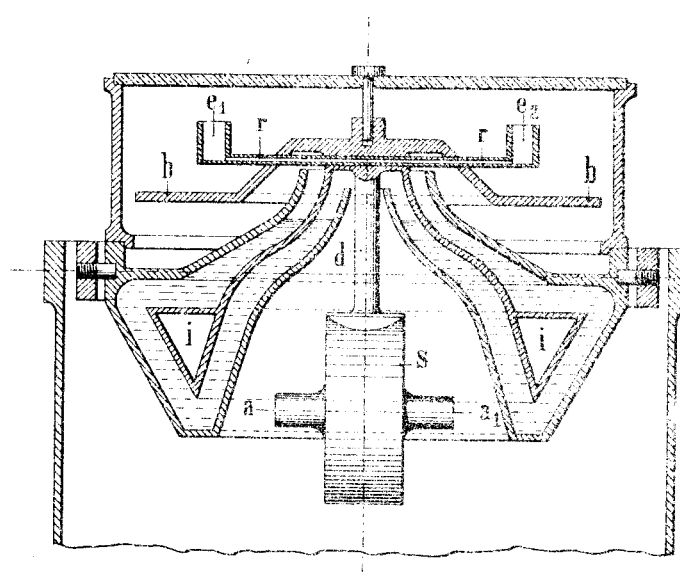
WITNESSES
INVENTOR
MAX SCHULER
BY
ATTORNEYS

UNITED STATES PATENT OFFICE.

MAX SCHULER, OF NEUMÜHLEN, NEAR KIEL, GERMANY, ASSIGNOR TO ANSCHUTZ & CO., OF NEUMÜHLEN, NEAR KIEL, GERMANY.

GYROSCOPIC COMPASS.

1,186,686.   Specification of Letters Patent.   Patented June 13, 1916.

Application filed June 7, 1911. Serial No. 631,699.

*To all whom it may concern:*

Be it known that I, MAX SCHULER, engineer, a subject of the Emperor of Germany, residing at Heikendorfer Weg 9, Neumühlen, near Kiel, Germany, have invented certain new and useful Improvements in or Relating to Gyroscopic Compasses, of which the following is a specification.

This invention relates to a gyroscopic compass in which the axis of the gyroscope is fixed by gravity in the horizontal plane and therefore makes oscillations about the N. S. direction. Simultaneously with these oscillations in the horizontal plane, the axis makes small oscillations in the vertical plane.

The invention comprises a device for damping these oscillations by work performed by the gyroscope during the vertical oscillations. To that end, on the movable system of the gyroscopic compass, in the N. S. direction are arranged two vessels containing a liquid and connected by a capillary tube of a given time of passage. During the oscillation of the gyroscopic axis, differences of level are produced in the two vessels. Consequently liquid is forced from one vessel into the other, and the energy required for the purpose, which during the passage through the narrow cross-section of the tube, is converted into heat, must be supplied by the oscillating spindle of the gyroscope. For that reason, the amplitudes of oscillation decrease to a corresponding extent. The narrow cross-section of tube produces a considerable lag between the oscillations of the axis of the gyroscope, and the equalization of the liquid, and that is of paramount importance. The required retarded movement of the masses, instead of being produced by a liquid, could also be brought by other resistance producing or energy absorbing means if preferred. The most favorable case is a time movement corresponding to about one-quarter of the time of oscillation of the compass.

Water-level-like arrangements or mass movements in a tube have been already applied to gyroscopic apparatus; see *e. g.*, U. S. Patent 877,034. If such a device is mounted on a gyroscopic apparatus making periodical oscillations, there will take place, owing to the very small friction of the liquid, a damping which however owing to its exceedingly small value, is of no practical importance. It is only when a considerable difference in time exists between the movement of the liquid or the like, and the elevation of the axis, that the damping reaches a higher, practically utilizable value.

In the accompanying drawing which represents a cross-section through a gyroscopic compass, the invention is explained.

In the said drawing, $s$ is the gyroscopic casing in which the gyroscope must be imagined to be mounted about the spindle $a\,a'$. The float $i$ is submerged in a vessel $f$ which contains mercury (in the manner well known in the art) and carries the whole compass system. To the card $b$ are secured two communicating vessels $e^1$ and $e^2$. The connecting tube $r$ is made of a suitably narrow cross-section. The vessels are filled with liquid, for instance with mercury. The two vessels are rigidly connected by means of a part $d$ to the bearings of the gyroscope, and therefore when the compass oscillates, energy is given off by the gyroscope to the liquid and then converted into heat in the tube of narrow cross-section.

What I claim as my invention and desire to secure by Letters Patent is:

1. In a gyroscopic compass, a movable system comprising a gyroscope, a mass movable within said movable system in a direction parallel to the gyroscope rotation axis, and means fixedly related to said system and symmetrically disposed as to the rotation axis of the system and frictionally engaged with said mass for retarding the movement thereof.

2. In a gyroscopic compass, a movable system comprising a gyroscope, and two vessels fixed in said movable system and connected by a tube of small bore, said vessels and tube being adapted to hold a liquid.

3. In a gyroscopic compass, a movable system comprising a gyroscope and having a passage of capillary bore lying in a plane transverse to the axis about which said system moves said passage being adapted to contain a mass of liquid.

4. In a gyroscopic compass a system arranged to move about a vertical axis comprising a compass card and a gyroscope, and a tube of capillary bore attached to said system parallel to said card, said tube being adapted to contain a liquid.

5. In a gyroscopic compass, a movable system comprising a gyroscope, and liquid holding means fixedly attached to said movable system said holding means comprising a pair of enlarged portions, adapted to hold relatively large quantities of liquid, connected by a restricted passage which is parrallel to the gyroscope rotation axis so that the liquid will suffer considerable retardation as it passes from one enlarged portion to the other.

6. In a gyroscopic compass, a system movable about a vertical axis said system comprising a gyroscope whose axis is normally horizontal, and means for damping oscillations of the gyroscope axis about a horizontal axis at right angles thereto whereby the oscillations of the system about a vertical axis are also damped.

7. In a gyroscopic compass, a system movable about a vertical axis said system comprising a gyroscope whose axis is normally horizontal, a mass movable within said system and adapted to move in one direction or the other according as the gyroscope axis oscillates in one direction or the other about a horizontal axis at right angles to itself, and frictional means fixed to the system and engaging with the mass so as to cause its movements to lag substantially behind the vertical oscillation of the gyroscope axis.

8. In a gyroscopic compass, a system movable about a vertical axis said system comprising a gyroscope whose axis is normally horizontal and means controlled by and proportional to the vertical oscillation of said gyroscope axis for directly retarding said oscillations frictionally so that oscillations of the system about the vertical axis are indirectly retarded the retarding means acting substantially later than the oscillations which bring them into action.

In witness whereof I have hereunto signed my name this 22nd day of May, 1911, in the presence of two subscribing witnesses.

MAX SCHULER.

Witnesses:
　JULIUS ROJIKE,
　CLAUDIUS HINZ.